US012686393B2

(12) United States Patent
Suzuki et al.

(10) Patent No.: US 12,686,393 B2
(45) Date of Patent: Jul. 21, 2026

(54) CONTROLLER AND CONTROL METHOD

(71) Applicant: ISUZU MOTORS LIMITED, Tokyo (JP)

(72) Inventors: Motoya Suzuki, Fujisawa (JP); Shuuichi Yahagi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 251 days.

(21) Appl. No.: 18/447,944

(22) Filed: Aug. 10, 2023

(65) Prior Publication Data

US 2024/0067186 A1 Feb. 29, 2024

(51) Int. Cl.
B60W 40/114 (2012.01)
B60W 50/00 (2006.01)
B60W 50/04 (2006.01)

(52) U.S. Cl.
CPC .......... B60W 40/114 (2013.01); B60W 50/04 (2013.01); B60W 2050/0028 (2013.01); (Continued)

(58) Field of Classification Search
CPC .............. B60W 40/114; B60W 50/04; B60W 2050/0028; B60W 2050/0052
See application file for complete search history.

(56) References Cited

U.S. PATENT DOCUMENTS 6,304,805 B1    10/2001  Onogi
8,447,443 B1 *   5/2013  Ryan .................... G05B 13/042
                                                340/992

(Continued)

FOREIGN PATENT DOCUMENTS

DE           600 20 020 T2      1/2006
DE      10 2016 119 142 A1      4/2017
(Continued)

OTHER PUBLICATIONS

Y. Wu, L. Wang, J. Zhang and F. Li, "Path Following Control of Autonomous Ground Vehicle Based on Nonsingular Terminal Sliding Mode and Active Disturbance Rejection Control," in IEEE Transactions on Vehicular Technology, vol. 68, No. 7, pp. 6379-6390, Jul. 2019, doi: 10.1109/TVT.2019.2916982 (Year: 2019).*

(Continued)

*Primary Examiner* — Abby J Flynn
*Assistant Examiner* — Clint Pham
(74) *Attorney, Agent, or Firm* — PROCOPIO, CORY, HARGREAVES & SAVITCH LLP

(57) ABSTRACT

A controller that performs PI control on a control input to a controlled object on the basis of a difference between a target value and an output, the controller including a model converting part that converts an ultra-local model obtained by modeling the controlled object into a state space model by defining a differential of an output of the controlled object including measurement noise by the control input and a deviation amount with respect to a reference model, an estimation part that estimates the deviation amount of the ultra-local model on the basis of a Kalman filter constructed from the state space model, and a steering angle calculation part that obtains the control input on the basis of the estimated deviation amount, a proportional gain, and an integral gain.

4 Claims, 4 Drawing Sheets

(52) U.S. Cl.
CPC . *B60W 2050/0052* (2013.01); *B60W 2520/06*
(2013.01); *B60W 2720/14* (2013.01)

(56) References Cited

U.S. PATENT DOCUMENTS

| 8,938,325 | B1 * | 1/2015 | McGinnis | B66C 13/08 |
| | | | | 701/4 |
| 2014/0306641 | A1 * | 10/2014 | Igarashi | H02P 23/12 |
| | | | | 318/561 |
| 2017/0106869 | A1 | 4/2017 | Lavoie et al. | |
| 2018/0264950 | A1 * | 9/2018 | Yokoyama | B60L 15/2045 |
| 2019/0375264 | A1 * | 12/2019 | Cha | B60W 10/22 |

FOREIGN PATENT DOCUMENTS

| DE | 11 2019 001 018 | T5 | 11/2020 |
| JP | 2010-126093 | A | 6/2010 |

OTHER PUBLICATIONS

Maker, "Autonomous Raspberry Pi AI Robot Car—Calibration",
dated Mar. 8, 2018, in 23 pages.
Themen, "A vehicle with steering and Raspberry Pi Zero—remote
control with BlueDot", Kittys Tech Blog, dated Feb. 22, 2021, in 36
pages. www.kittytech.de-beispielfahrzeug-lenkung.

* cited by examiner

CONTROLLER AND CONTROL METHOD

CROSS-REFERENCE TO RELATED APPLICATIONS

The present application claims priority to Japanese Patent Applications number 2022-134335, filed on Aug. 25, 2022 contents of which are incorporated herein by reference in their entirety.

BACKGROUND OF THE INVENTION

The present disclosure relates to a controller and a control method for performing PI control. As a controller that controls a control input to a controlled object on the basis of a difference between a target value and an output from the controlled object, a yaw rate controller that controls a yaw rate of a vehicle has been known. For example, the yaw rate controller controls a steering angle of the vehicle according to a difference between a target yaw rate and an actual yaw rate (see, for example, Japanese Unexamined Patent Application Publication No. 2010-126093).

In recent years, in order to reduce a divergence between the target value and the output of the controlled object, it has been proposed to use PI control together with a method for obtaining the control input by estimating a deviation amount of the output from the controlled object specified in an ultra-local model. However, in the above method, the influence of measurement noise included in the output may increase since the output is differentiated when estimating an error.

BRIEF SUMMARY OF THE INVENTION

The present disclosure focuses on this point, and its object is to realize PI control in which the influence of measurement noise is suppressed.

A first aspect of the present disclosure provides a controller which is a controller that performs PI control on a control input to a controlled object on the basis of a difference between a target value set to the controlled object and an output from the controlled object; the controller including: a model converting part that converts an ultra-local model obtained by modeling the controlled object into a state space model by defining a differential of an output of the controlled object including measurement noise by the control input and a deviation amount with respect to a reference model; an estimation part that estimates the deviation amount of the ultra-local model on the basis of a Kalman filter constructed from the state space model; and a calculation part that obtains the control input on the basis of the estimated deviation amount, a proportional gain, and an integral gain.

A second aspect of the present disclosure provides a control method which is a control method for performing PI control on a control input to a controlled object on the basis of a difference between a target value set to the controlled object and an output from the controlled object; the control method comprising the steps of: converting an ultra-local model obtained by modeling the controlled object into a state space model by defining a differential of an output of the controlled object including measurement noise by the control input and a deviation amount with respect to a reference model; estimating the deviation amount of the ultra-local model on the basis of a Kalman filter constructed from the state space model; and obtaining the control input on the basis of the estimated deviation amount, a proportional gain, and an integral gain.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Configuration of a Yaw Rate Control System>

A yaw rate control system is a system that controls a yaw rate of a traveling vehicle. The yaw rate means a velocity at which a rotation angle changes in the turning direction of the vehicle. Before describing a configuration of the yaw rate control system according to the present disclosure, a configuration of the yaw rate control system according to a comparative example will be described with reference to FIG. 4.

Figure 4:
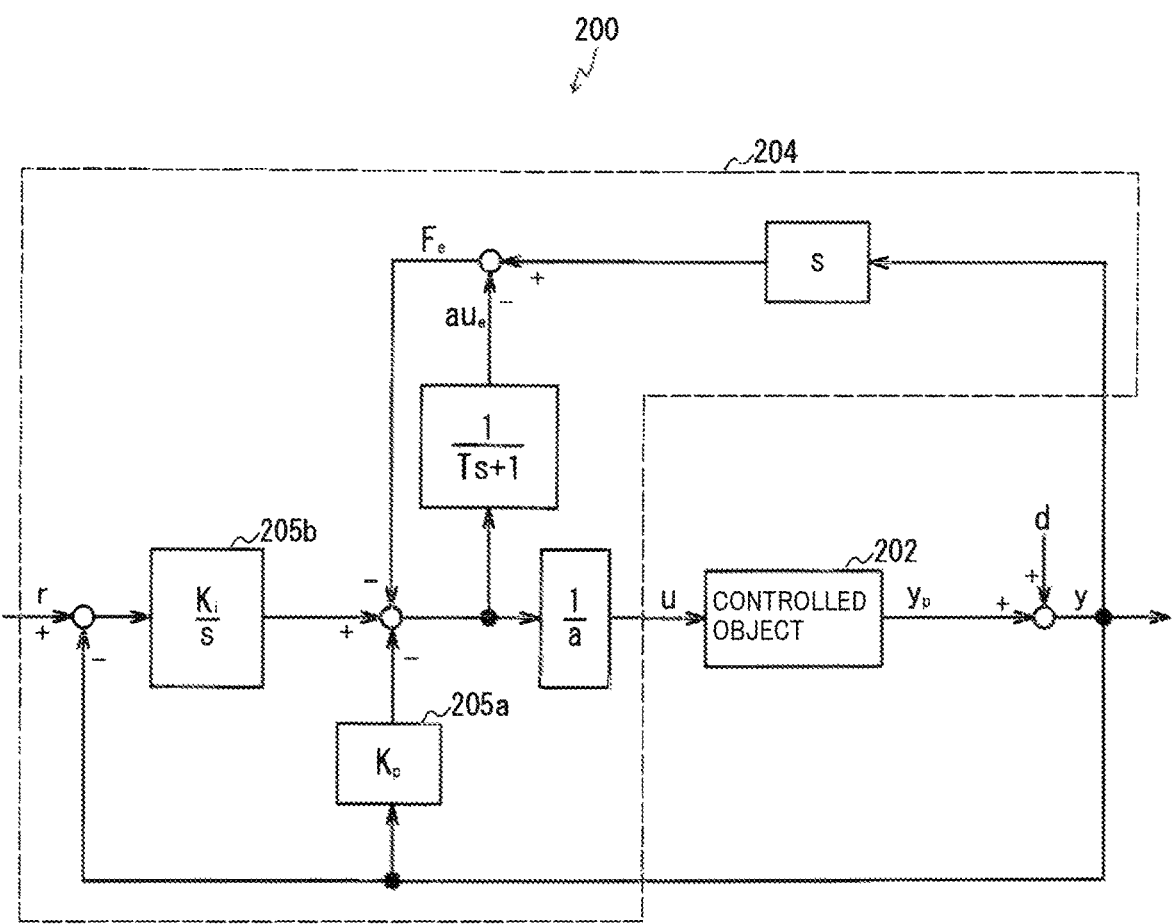
FIG. 4 is a schematic diagram showing a configuration of a yaw rate control system 200 according to a comparative example.

FIG. 4 is a schematic diagram illustrating a configuration of a yaw rate control system 200 according to the comparative example. As shown in FIG. 4, the yaw rate control system 200 includes a controlled object 202 and a yaw rate controller 204.

Here, the controlled object 202 is a vehicle (specifically, a steering apparatus of the vehicle). A steering angle u, which is a control input, is input to the controlled object 202. An actual yaw rate y is output as an output from the controlled object 202.

The yaw rate controller 204 controls the steering angle u, which is the control input of the controlled object 202, on the basis of a deviation between a target yaw rate r and the actual yaw rate y. The yaw rate controller 204 feedback-controls the steering angle u so that a deviation e between the target yaw rate r and the actual yaw rate y is zero. The yaw rate controller 204 includes a proportioner 205a and an integrator 205b in order to perform PI control.

In the yaw rate control system 200, in order to realize a desired yaw rate response, the controlled object 102 is modeled as a well-known ultra-local model. The ultra-local model is also referred to as a super-local model, and is expressed by Equation 1.

$$\dot{y} = au + F \qquad (1)$$

In Equation 1, "a" is a design parameter and F is a deviation amount. The deviation amount F is a deviation amount with respect to a reference model designed for desired response characteristics, and includes various errors.

An estimated deviation amount $F_e$ obtained by estimating the deviation amount F is expressed by Equation 2 from Equation 1.

$$F_e = \dot{y} - au_e \qquad (2)$$

$u_e$ in Equation 2 is an estimated input obtained by estimating the steering angle u, which is the control input, and is expressed by Equation 3.

$$u_e = \frac{1}{Ts+1}u \qquad (3)$$

In this case, the steering angle u is expressed by Equation 4.

$$u = \frac{1}{a}\left\{ \frac{K_i}{s}e - K_p y - F_e \right\} \qquad (4)$$

In Equation 4, $K_p$ is a proportional gain and $K_i$ is an integral gain.

The actual yaw rate y is determined from an output $y_p$ of the controlled object 202 and measurement noise d. Therefore, the ultra-local model shown in Equation 1 is a model in which a differential of the output of the controlled object 202 including the measurement noise d is defined by the steering angle u and the deviation amount F.

The estimated deviation amount $F_e$ of Equation 2 is expressed by Equation 5.

$$F_e = \dot{y}_p - au_e + \dot{d} \qquad (5)$$

The estimated deviation amount $F_e$ is expressed by using a value obtained by differentiating the actual yaw rate y, as shown in Equation 2, and is expressed by a value obtained by differentiating the measurement noise d, as shown in Equation 5. Since the estimated deviation amount $F_e$ increases when the measurement noise d is differentiated, the estimated deviation amount $F_e$ is likely to be affected by the measurement noise d. As a result, the steering angle u, which is the control input, would oscillate as well.

On the other hand, although details will be described later, a yaw rate control system 100 according to the present disclosure shown in FIG. 1 can realize yaw rate control capable of suppressing the influence of the measurement noise d by obtaining the estimated deviation amount $F_e$ by applying a Kalman filter.

Figure 1:
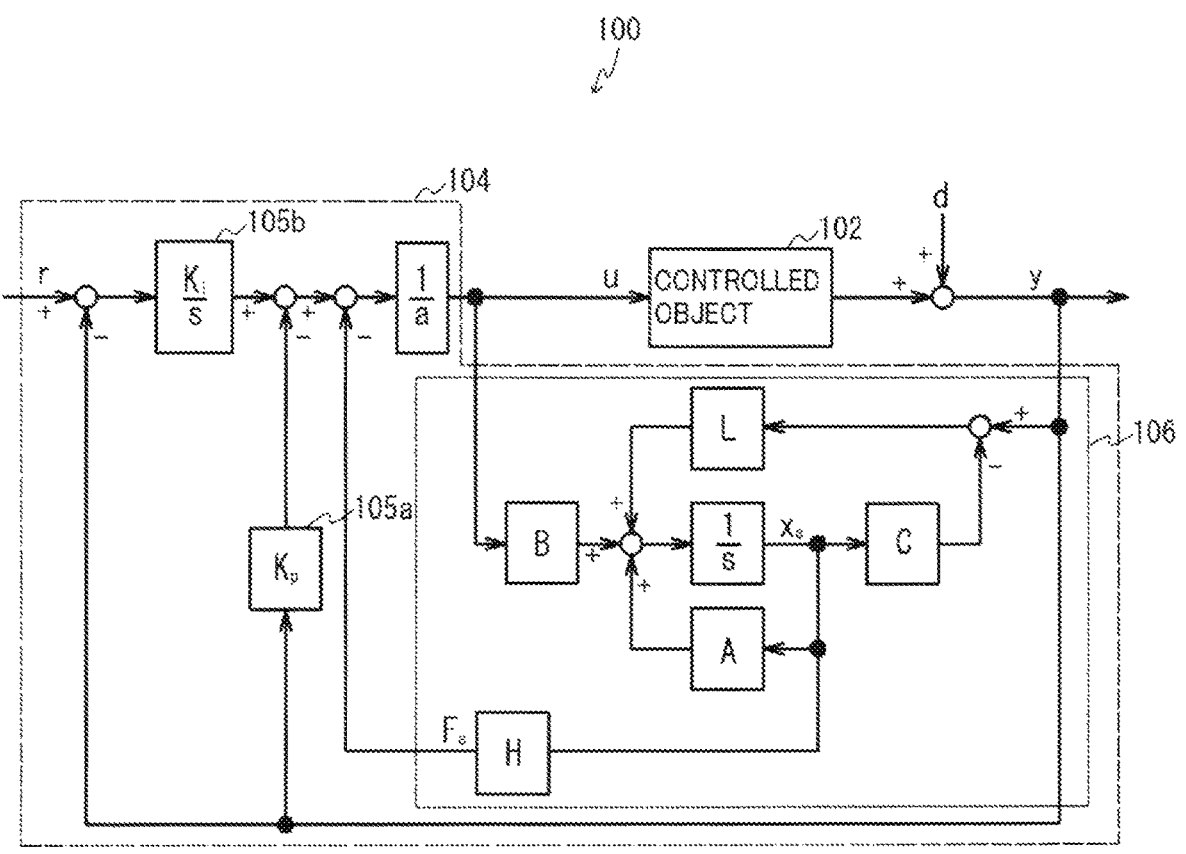
FIG. 1 is a schematic diagram showing a configuration of a yaw rate control system 100.

FIG. 1 is a schematic diagram showing a configuration of the yaw rate control system 100 according to an embodiment. The yaw rate control system 100 performs yaw rate control so as to reduce a divergence between a target yaw rate and an actual yaw rate caused by a change in a velocity of a vehicle, a change in a center of gravity position of a vehicle, or the like. The yaw rate control system 100 includes a controlled object 102 and a yaw rate controller 104.

Similar to the controlled object 202 described above, the controlled object 102 is modeled as an ultra-local model. That is, the controlled object 102 is defined by the above-described Equation 1.

Similarly to the yaw rate controller 204 described above, the yaw rate controller 104 controls a steering angle u, which is a control input of the controlled object 102, on the basis of the deviation between the target yaw rate r and the actual yaw rate y. The yaw rate controller 104 includes a proportioner 105a and an integrator 105b in order to perform PI control.

On the other hand, unlike the yaw rate controller 204, the yaw rate controller 104 includes a Kalman filter part 106. The Kalman filter part 106 has a function of estimating the estimated deviation amount $F_e$ so that the influence of the measurement nozzle d does not occur. In FIG. 1, the yaw rate controller 104 is indicated by a dashed-line block, and the Kalman filter part 106 is indicated by a dotted-line block. The Kalman filter part 106 will be described in detail later.

In the yaw rate control system 100, the steering angle u, which is the control input, is obtained in the following manner. Here, it is assumed that a velocity change of the deviation amount F of the above-described Equation 1 is minute. In this case, Equation 6 is satisfied.

$$\dot{F} = 0 \qquad (6)$$

Under the above assumptions, the ultra-local model is transformed into a state space model. The transformed state space model is defined by Equation 7 to Equation 12.

$$\dot{x} = Ax + Bu \qquad (7)$$

$$y = Cx \qquad (8)$$

$$x = \begin{bmatrix} y \\ F \end{bmatrix} \qquad (9)$$

$$A = \begin{bmatrix} 0 & 1 \\ 0 & 0 \end{bmatrix} \qquad (10)$$

$$B = \begin{bmatrix} a \\ 0 \end{bmatrix} \qquad (11)$$

$$C = [1 \quad 0] \qquad (12)$$

Equation 7 is a state equation, and Equation 8 is an observation equation. "x" is a state variable, and A, B, and C are coefficients obtained from the ultra-local model.

Next, the Kalman filter part 106, which is a Kalman filter for estimating an estimated deviation amount $F_e$, is configured using the state space model. The Kalman filter is a method for estimating a state in the state space model. The Kalman filter is a type of infinite impulse response filter for estimating or controlling a state of a dynamic system using an observation value including an error. The Kalman filter is a steady Kalman filter, for example, and is defined by Equations 13 to 15.

$$\dot{x}_e = Ax_e + Bu + L(y - y_e) \qquad (13)$$

$$x_e = \begin{bmatrix} y_e \\ F_e \end{bmatrix} \qquad (14)$$

$$L = \begin{bmatrix} L_y \\ L_F \end{bmatrix} \qquad (15)$$

In Equation 13, $x_e$ is an estimated value of the state variable x, and $y_e$ is an estimated value of the actual yaw rate y. A Kalman gain L shown in Equation 15 is derived from a well-known Riccati equation.

The steering angle u, which is the control input, is expressed by Equations 16 and 17 from an estimation law of the estimated deviation amount $F_e$ and a PI control law.

$$u = \frac{1}{a}\left\{\frac{K_i}{s}e - K_p y - Hx_e\right\} \tag{16}$$

$$H = [0 \quad 1] \tag{17}$$

As can be seen from Equations 13 to 15, it is not necessary to differentiate the actual yaw rate y when estimating the estimated deviation amount $F_e$ in the case where the Kalman filter is applied. Therefore, the estimated deviation amount $F_e$ can be estimated by suppressing the influence of the measurement noise d included in the actual yaw rate y. As a result, the steering angle u expressed by the Equation 16 can be prevented from oscillating due to an increase in the measurement noise d.

Figure 2A:
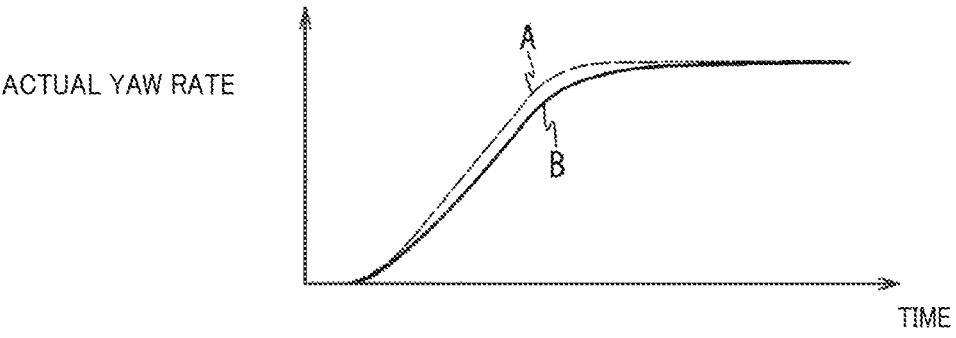
FIGS. 2A and 2B show simulation results.
Figure 2B:
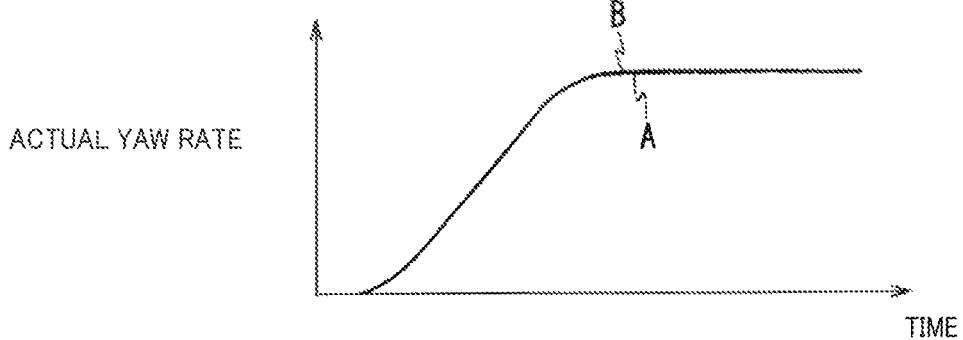

FIGS. 2A and 2B show simulation results. A broken line A indicates the target yaw rate, and a solid line B indicates the actual yaw rate. FIG. 2A shows a simulation result of the yaw rate control system 200 according to the comparative example shown in FIG. 4, and FIG. 2B shows a simulation result of the yaw rate control system 100 according to the embodiment shown in FIG. 1. In the comparative example, an actual yaw rate B deviates from a target yaw rate A, as shown in FIG. 2A. On the other hand, in the present embodiment, the actual yaw rate B shows a value close to the target yaw rate A, as shown in FIG. 2B. From these results, it is understood that yaw rate control in which the influence of measurement noise is suppressed can be realized in the case of the present embodiment. In FIG. 2B, since the actual yaw rate B approximately coincides with the target yaw rate A, the broken line indicating the target yaw rate A is hidden by the solid line indicating the actual yaw rate B.

<Configuration of a Yaw Rate Controller>

Figure 3:
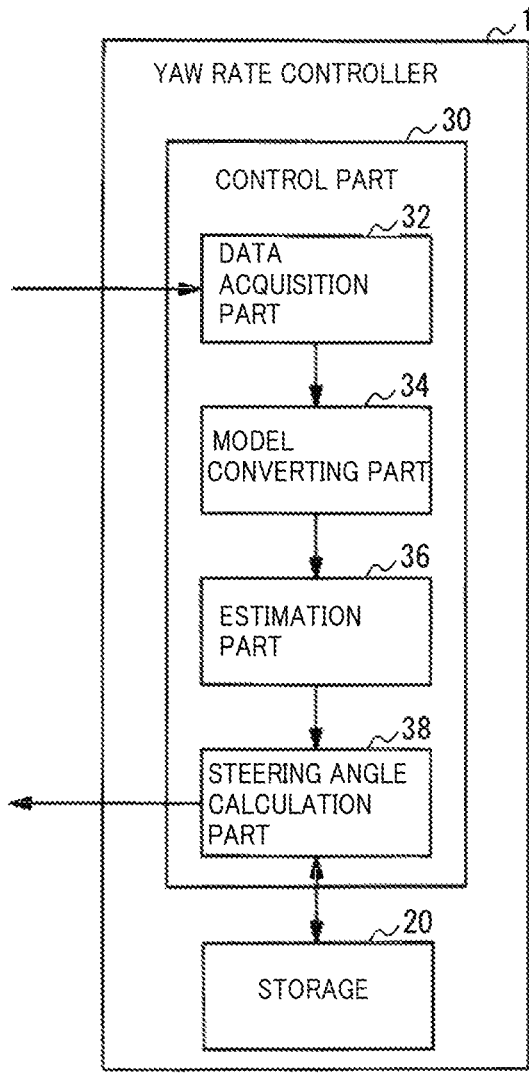
FIG. 3 is a schematic diagram showing a functional configuration of a yaw rate controller 1.

FIG. 3 is a schematic diagram showing a functional configuration of the yaw rate controller 1. The yaw rate controller 1 corresponds to a controller that performs PI control on a control input to a controlled object on the basis of a difference between a target value set to the controlled object and an output from the controlled object.

The yaw rate controller 1 corresponds to the yaw rate controller 104 shown in FIG. 1. Here, the yaw rate controller 1 is mounted on a vehicle. The yaw rate controller 1 performs PI control on a steering angle of the vehicle, which is a control input, on the basis of a difference between a target yaw rate and an actual yaw rate of the vehicle. As shown in FIG. 3, the yaw rate controller 1 includes a storage 20 and a control part 30.

The storage 20 includes a read only memory (ROM) storing a basic input output system (BIOS) of a computer or the like, and a random access memory (RAM) serving as a work area. The storage 20 is a large-capacity storage device such as a hard disk drive (HDD), a solid state drive (SSD), and the like that stores an operating system (OS), an application program, and various types of information to be referred to at the time of executing the application program.

The control part 30 is a processor such as a central processing unit (CPU) or a graphics processing unit (GPU). The control part 30 functions as a data acquisition part 32, a model converting part 34, an estimation part 36, and a steering angle calculation part 38 by executing the program stored in the storage 20.

The data acquisition part 32 acquires the target yaw rate and the actual yaw rate. For example, the data acquisition part 32 acquires a target yaw rate set by an ECU of the vehicle. The data acquisition part 32 acquires an actual yaw rate detected by a detection part such as a sensor mounted on the vehicle. The data acquisition part 32 may acquire the target yaw rate and the actual yaw rate at predetermined intervals during traveling of the vehicle.

The model converting part 34 converts an ultra-local model of the controlled object (e.g., steering apparatus) into a state space model. As described above, the ultra-local model is a model obtained by modeling the controlled object by defining the differential of the output of the controlled object including measurement noise by the control input and the deviation amount with respect to the reference model. The model converting part 34 converts the ultra-local model expressed by the above-described Equation 1 into the state space model expressed by the above-described Equations 7 to 12. At this time, since the velocity change of the deviation amount F is minute, the model converting part 34 sets the differential of the deviation amount F of the ultra-local model to 0. Specifically, the model converting part 34 converts the ultra-local model into the state conversion model assuming that the differential of the deviation amount F is 0, as shown in the above-described Equation 6.

The estimation part 36 estimates the deviation amount of the ultra-local model on the basis of a Kalman filter constructed from the state space model. Specifically, the estimation part 36 estimates the estimated deviation amount $F_e$ by applying the Kalman filter defined by the above-described Equations 13 to 15. Here, the estimation part 36 estimates the estimated deviation amount $F_e$ by applying a steady state Kalman filter, serving as the Kalman filter. In this case, a Kalman gain of the Kalman filter can be derived by the Riccati equation, and therefore the estimated deviation amount $F_e$ can be easily estimated. Further, the estimation part 36 may estimate an estimated value of the actual yaw rate on the basis of the Kalman filter constructed from the state space model. Specifically, the estimation part 36 estimates the estimated value $y_e$ of the actual yaw rate, as shown in the above-described Equations 13 to 15.

The steering angle calculation part 38 obtains a control input on the basis of an estimated deviation amount $F_e$, a proportional gain, and an integral gain. The steering angle calculation part 38 calculates the control input on the basis of the estimated deviation amount $F_e$, the estimated value $y_e$ of the actual yaw rate, the proportional gain, and the integral gain. Specifically, the steering angle calculation part 38 obtains the steering angle u, which is the control input, of the vehicle from the above-described Equations 16 and 17. That is, the steering angle calculation part 38 calculates the steering angle u from the estimation law of the estimated deviation amount $F_e$ and the PI control law. Since the estimated deviation amount $F_e$ does not include a differential of the measurement noise d, the influence of the measurement noise d at the obtained steering angle u is suppressed.

Effect of the Present Embodiment

The yaw rate controller 1 of the embodiment described above includes the model converting part 34 that converts the ultra-local model defining the controlled object 102 including a measurement noise d into the state space model, and the estimation part 36 that estimates the estimated deviation amount $F_e$ of the ultra-local model on the basis of the Kalman filter constructed from the state space model. Further, the yaw rate controller 1 includes the steering angle calculation part 38 that calculates the steering angle u, which is the control input, on the basis of the estimated deviation amount $F_e$, the proportional gain, and the integral gain. When the estimation part 36 estimates the estimated deviation amount $F_e$ by applying the Kalman filter, the yaw rate control in which the influence of the measurement noise d included in the actual yaw rate y has been suppressed can be realized since the Kalman filter does not differentiate the actual yaw rate y (output of the controlled object.) In addition, since the divergence between the target yaw rate r and the actual yaw rate y caused by the change in the velocity of the vehicle, the change in the center of gravity position of the vehicle, or the like can be reduced, degradation of the yaw rate control can be suppressed.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. A controller which is a controller that performs proportional integral (PI) control on a control input to a controlled object on a basis of a difference between a target value set to the controlled object and an output from the controlled object, the controller comprising:

a processor coupled to a memory storing instructions for the processor to function as:

a model converting part that converts an ultra-local model obtained by modeling the controlled object into a state space model by defining a differential of an output of the controlled object including measurement noise by the control input and a deviation amount with respect to a reference model;

an estimation part that estimates the deviation amount of the ultra-local model on a basis of a Kalman filter constructed from the state space model;

a calculation part that obtains the control input on a basis of the estimated deviation amount, a proportional gain, and an integral gain, wherein the output is an actual yaw rate of a vehicle, the target value is a target yaw rate of the vehicle, and the control input is a steering angle of the vehicle; and a data acquisition part that acquires the target yaw rate set by the controller of the vehicle and the actual yaw rate detected by a sensor mounted on the vehicle during traveling of the vehicle, wherein the processor outputs the steering angle obtained by the calculation part to a steering apparatus of the vehicle, and wherein the model converting part converts the ultra-local model into the state space model by setting a differential of the deviation amount of the ultra-local model to 0.

2. The controller according to claim 1, wherein the model converting part converts the ultra-local model into the state space model including a state equation and an observation equation defined by the output and the deviation amount.

3. The controller according to claim 1, wherein the estimation part further estimates an output value of the output on the basis of the Kalman filter, and the calculation part obtains the control input on the basis of the estimated deviation amount and output value, the proportional gain, and the integral gain.

4. A control method which is a control method for performing proportional integral (PI) control on a control input to a controlled object on a basis of a difference between a target value set to the controlled object and an output from the controlled object; the control method comprising:

converting an ultra-local model obtained by modeling the controlled object into a state space model by defining a differential of an output of the controlled object including measurement noise by the control input and a deviation amount with respect to a reference model;

estimating the deviation amount of the ultra-local model on a basis of a Kalman filter constructed from the state space model;

obtaining the control input on a basis of the estimated deviation amount, a proportional gain, and an integral gain, wherein the output is an actual yaw rate of a vehicle, the target value is a target yaw rate of the vehicle, and the control input is a steering angle of the vehicle;

acquiring the target yaw rate set by a controller of the vehicle and the actual yaw rate detected by a sensor mounted on the vehicle during traveling of the vehicle; and outputting, by the controller, the steering angle obtained by the obtaining of the control input to a steering apparatus of the vehicle, wherein the converting of the ultra-local model includes converting the ultra-local model into the state space model by setting a differential of the deviation amount of the ultra-local model to 0.

* * * * *